(12) United States Patent
Izumi et al.

(10) Patent No.: US 7,084,761 B2
(45) Date of Patent: Aug. 1, 2006

(54) SECURITY SYSTEM

(75) Inventors: Shiho Izumi, Hitachi (JP); Hiroshi Kuroda, Hitachi (JP); Satoru Kuragaki, Hitachi (JP); Kazuhiko Sato, Mito (JP); Terumi Nakazawa, Naka-machi (JP); Kenichi Mitzuishi, Hachioji (JP); Kazuaki Takano, Mito (JP); Mitsuhide Sasaki, Hitachinaka (JP); Hiroshi Kondoh, Fuchu (JP); Mikito Tsubota, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/226,116

(22) Filed: Aug. 23, 2002

(65) Prior Publication Data

US 2003/0112142 A1 Jun. 19, 2003

(30) Foreign Application Priority Data

Dec. 19, 2001 (JP) ............................. 2001-385383

(51) Int. Cl.
*G08B 13/00* (2006.01)

(52) U.S. Cl. ................... 340/541; 340/545.3; 340/565; 342/28

(58) Field of Classification Search ................ 340/541, 340/545.3, 554, 555, 557, 565, 500, 686.1, 340/539.1, 506; 342/28, 99
See application file for complete search history.

(56) References Cited

U.S. PATENT DOCUMENTS

| | | | | |
|---|---|---|---|---|
| 4,243,979 A | * | 1/1981 | Kleinschmidt | .............. 340/554 |
| 4,470,696 A | * | 9/1984 | Ballard | ....................... 356/28.5 |
| 5,786,760 A | * | 7/1998 | Suzuki et al. | ................ 340/541 |
| 5,936,524 A | * | 8/1999 | Zhevelev et al. | ........... 340/552 |
| 6,188,319 B1 | * | 2/2001 | Frucht | ......................... 340/557 |
| 6,208,248 B1 | | 3/2001 | Ross | .......................... 340/552 |
| 6,307,475 B1 | * | 10/2001 | Kelley | ..................... 340/573.1 |
| 6,380,882 B1 | * | 4/2002 | Hegnauer | .................... 342/28 |

FOREIGN PATENT DOCUMENTS

| | | |
|---|---|---|
| JP | 07-021475 | 1/1995 |
| JP | 7-509793 | 10/1995 |
| JP | 8-249553 | 9/1996 |
| JP | 2000-003478 | 6/1998 |
| JP | 2000-336231 | 12/2000 |
| JP | 2000-338231 | 12/2000 |
| WO | WO93/23833 | 11/1993 |

OTHER PUBLICATIONS

Japanese Office Action dated Aug. 17, 2005, with partial English translation.

* cited by examiner

*Primary Examiner*—Phung T. Nguyen
(74) *Attorney, Agent, or Firm*—Crowell & Moring LLP (57) ABSTRACT

There is provided a device in which surroundings of a building can be monitored using a sensor; when detecting an intruder, an object can be detected even in the case of bad weather; and a predetermined area can be monitored using as few sensors as possible. The device includes a security system which emits a radio wave from a building to a predetermined area outside the building to detect an object, and on the basis of output of the object detecting unit, a judgment is made as to whether or not the object will intrude into the predetermined area.

9 Claims, 9 Drawing Sheets

SECURITY SYSTEM

BACKGROUND OF THE INVENTION

1. Field of the Invention

The present invention relates to a security system which monitors intrusion by a person, an object, or the like.

2. Related Art

Examples of a sensor for monitoring surroundings of a building to detect an intruder include a security system which uses infrared rays. In this system, both of a transmitting unit for transmitting infrared rays and a receiving unit for receiving the infrared rays are installed in an intrusion monitoring area in order to detect interruption of light receiving, and thereby an intruder is detected. An infrared sensor is easily influenced by weather, and it takes time to adjust optical axes of the transmitting and receiving units. In addition, the infrared sensors should be installed in surroundings of the building, which produces a problem of high wiring cost.

In addition, examples of a sensor for detecting an intruder, which uses a radar, include an intruder detecting device disclosed in Japanese Patent Laid-Open No. 2000-3478. This device is capable of knowing the existence, position, number, moving direction of a person by the following steps: transmitting and receiving a radio wave; performing frequency spectrum operation of a state of surroundings; and thereby detecting its change. As described above, because the intruder detecting device which uses a radio wave has a narrow emitting angle of a radio wave, it is difficult to emit a radio wave over a wide area if the intruder detecting device is used outdoors.

SUMMARY OF THE INVENTION

Objects of the present invention are to provide a security system which is easy to install, to provide a system, security of which is higher than those of the conventional systems, and to provide a security system which does not mar a building.

The present invention is accomplished by a security system comprising: an object detecting unit which emits light or a radio wave from a building to a predetermined area outside the building, receives a wave reflected from an object, and detects the object on the basis of the reflected wave; and an area intrusion judging unit for judging whether or not the object will intrude into the predetermined area on the basis of output of the detecting unit.

BRIEF DESCRIPTION OF THE DRAWINGS

Other objects and advantages of the invention will become apparent from the following description of embodiments with reference to the accompanying drawings in which.

DESCRIPTION OF THE PREFERRED EMBODIMENTS

The present invention is accomplished by a security system comprising: an object detecting unit which emits light or a radio wave from a building to a predetermined area outside the building, receives a wave reflected from an object, and detects the object on the basis of the reflected wave; and an area intrusion judging unit for judging whether or not the object will intrude into the predetermined area on the basis of output of the detecting unit.

The present invention is accomplished by a security system comprising: an object detecting unit which emits light or a radio wave from a building to a predetermined area outside the building, receives a wave reflected from an object, and detects the object on the basis of the reflected wave; and an area intrusion judging unit for judging whether or not the object will intrude into the predetermined area on the basis of output of the detecting unit; wherein said object detecting unit includes a plurality of object detecting devices installed in a multidirectional manner so as to cover the predetermined area which is within a range of 360°.

The present invention is accomplished by a security system comprising: an object detecting unit which emits light or a radio wave from a building to a predetermined area outside the building, receives a wave reflected from an object, and detects the object on the basis of the reflected wave; and a building intrusion predicting unit for tracking the object in the predetermined area on the basis of output of the detecting unit to predict whether or not the object will intrude into the building.

The present invention is accomplished by a security system comprising: an object detecting unit which emits light or a radio wave from a building to a predetermined area outside the building, receives a wave reflected from an object, and detects the object on the basis of the reflected wave; and a building intrusion predicting unit for tracking the object in the predetermined area on the basis of output of the detecting unit to predict whether or not the object will intrude into the building; wherein said object detecting unit has object detecting devices installed on a wall surface of the building so as to cover the predetermined area which is within a range of 360°.

The present invention will be described according to each embodiment as below.

First Embodiment

Figure 2:
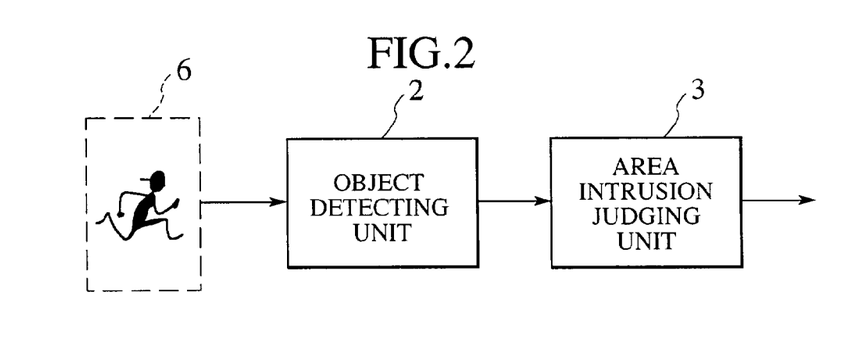
FIG. 2 is a diagram illustrating an example of a configuration in which a judgment is made as to whether or not an object will intrude into a predetermined area.

A first embodiment is based on a security system which monitors an object in an area within a predetermined range around a building, and relates to a method in which object detecting devices 1 are installed on the building and thereby a judgment is made as to whether or not a detected object will intrude into the area. FIG. 2 illustrates the configuration of this embodiment. The configuration comprises an object detecting unit 2 for detecting an object, and an area intrusion judging unit 3 for judging whether or not the detected object will intrude into the predetermined area. This embodiment will be described using a radar device as an object detecting device 1 capable of calculating relative velocity to the object and its position.

Figure 3:
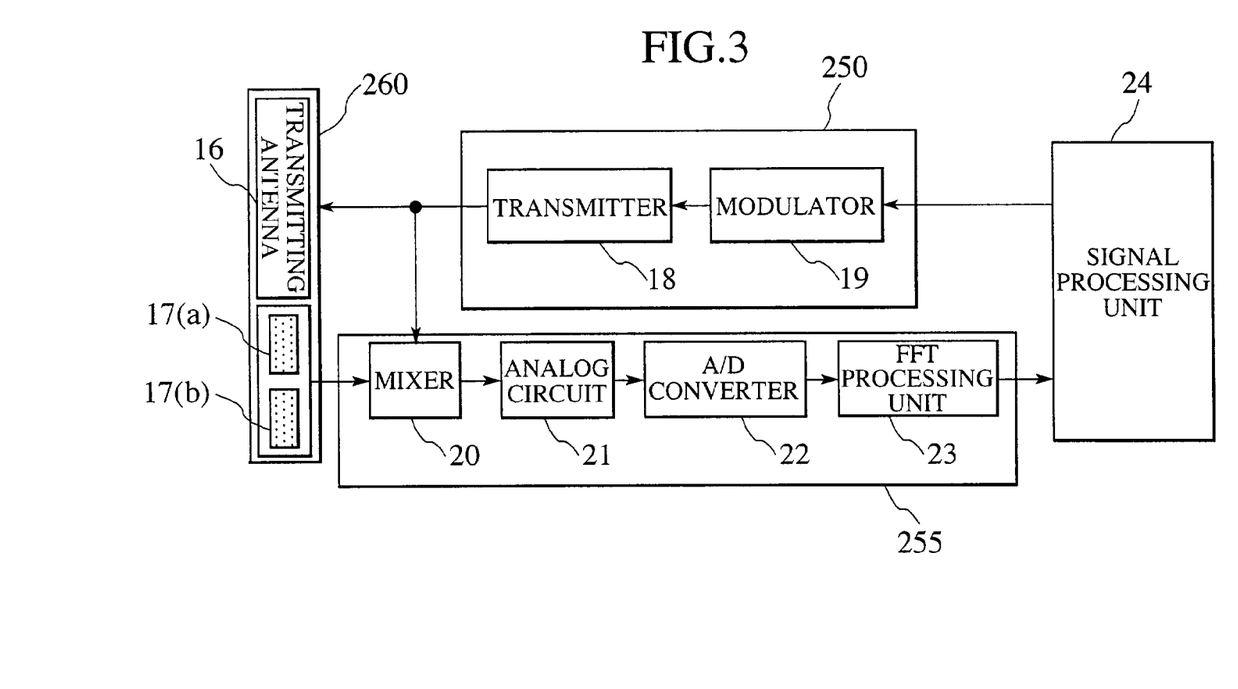
FIG. 3 is a diagram illustrating principles of a radar device.

A method in which the radar device measures the relative velocity and the distance will be described with reference to FIG. 3. The radar device comprises a transmitting unit 250 which modulates a radar wave and transmits the modulated radar wave; a receiving unit 255 which receives the reflected radar wave and generates data; an antenna unit 260; and a signal processing unit 24. The antenna unit 260 comprises a transmitting antenna 16 and receiving antennas 17(a), 17(b). A high-frequency signal in a millimeter wave band, which has been transmitted from a transmitter 18 on a transmission frequency based on a modulated signal coming from a modulator 19, is emitted from the transmitting antenna 16. A radio wave signal reflected by a reflecting object such as a car and an object along a road is received by the receiving antennas 17(a) and 17(b). Then, the radio wave signal is frequency-converted by a mixer circuit 20. This mixer circuit 20 is also supplied with a signal from the transmitter 18. A low frequency signal which is generated by mixing these two signals is outputted to an analog circuit 21. A signal, which is outputted by the analog circuit 21 after amplification, is converted into a digital signal by an A/D converter 22. Then, the A/D converter 22 supplies the converted signal to an FFT processing unit 23. The FFT processing unit 23 measures a frequency spectrum of a signal as amplitude and phase information by means of fast Fourier transform, and then transmits the information to the signal processing unit 24. Using data in the frequency domain obtained in the FFT processing unit 23, the signal processing unit 24 calculates a range and relative velocity, and then outputs them as measurements of the range and the relative velocity.

Here, an example which uses a double-channel CW (Continuous Wave) method will be described with reference to FIGS. 3 and 4. In the double-channel CW method, Doppler shift is utilized to measure relative velocity of an object, and switching between two frequencies enables measurement of a distance to the object on the basis of phase information of a signal received at each frequency.

Figure 4A:
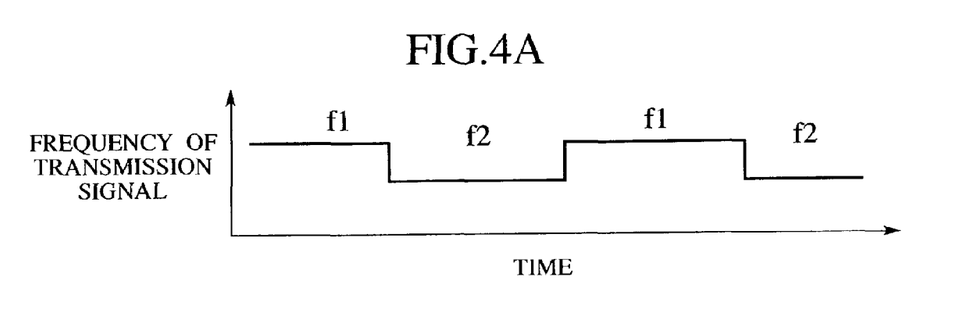
FIGS. 4A and 4B are diagrams illustrating principles of a double-channel CW method.
Figure 4B:
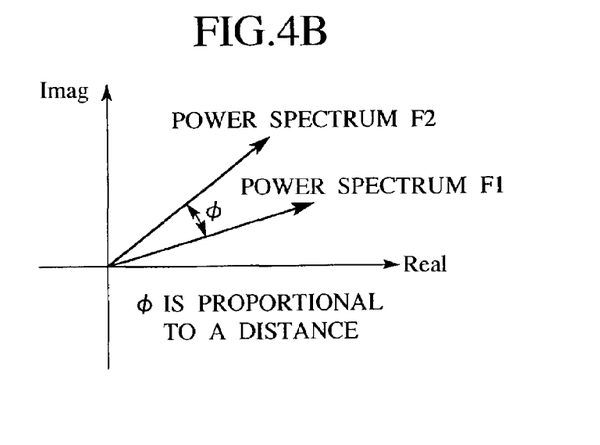

In the case of a radar which uses the double-channel CW method, a modulated signal is inputted to the transmitter 18; and as shown in FIG. 4A, two frequencies $f_1$ and $f_2$ are transmitted while the frequencies are switched periodically. A radio wave which has been transmitted from the transmitting antenna 16 is reflected by an object in front. After that, the reflected signal is received by the receiving antennas 17(a) and 17(b). The mixer circuit 20 multiplies the received signal by the signal of the transmitter 18 to obtain beat signal thereof. In the case of the homodyne method which directly converts into a baseband, a beat signal which is outputted from the mixer circuit 20 is so-called Doppler frequency. The Doppler frequency is calculated by the following equation.

$$f_d = \frac{2 \cdot f_c}{c} \dot{R} \qquad \text{Equation 1}$$

where $f_c$ is a carrier-wave frequency, $\dot{R}$ is relative velocity, and c is light velocity.

On a receiving side, the analog circuit 21 separates and demodulates the received signal at each transmission frequency. Then, an A/D converter 22 performs analog-to-digital conversion of the received signal at each transmission frequency. The FFT processing unit 23 performs fast Fourier transform processing for digital sample data, which has been obtained by the A/D conversion, and thereby obtains a frequency spectrum on all frequency bands of the received beat signal. After a peak signal is obtained as a result of the FFT processing, a power spectrum of a peak signal for each of a transmission frequency f1 and a transmission frequency f2, as shown in FIG. 4B, is measured on the basis of the principles of the double-channel CW method. Then, a range is calculated from phase difference ϕ between the two power spectra using an equation as below.

$$\text{range} = \frac{c \cdot \phi}{4\pi \cdot \Delta f} \qquad \text{Equation 2}$$

Figure 5:
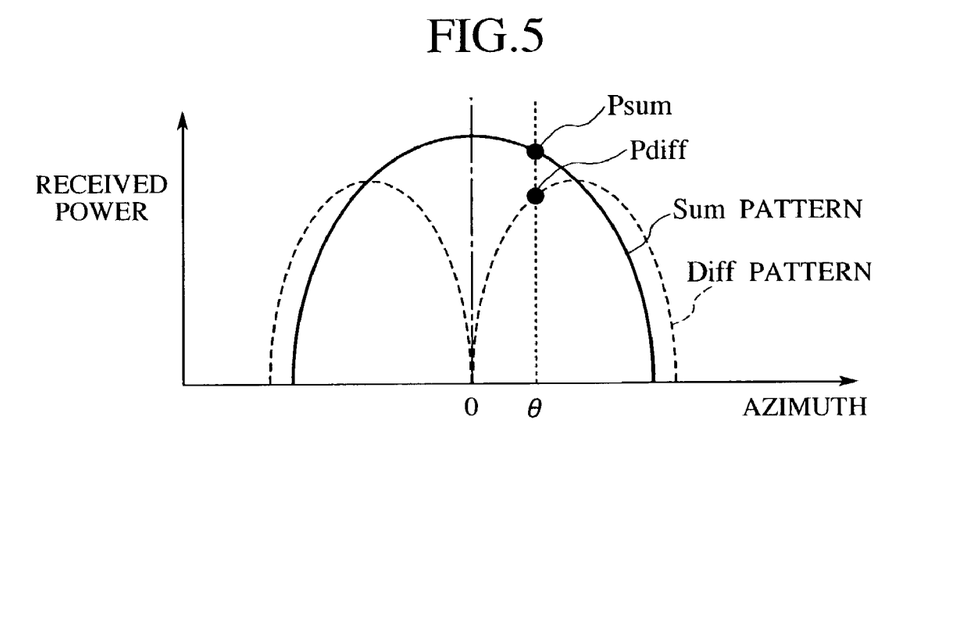
FIG. 5 is a diagram illustrating principles of angle measurement by means of a monopulse system.

Next, measurement of a direction will be described with reference to FIG. 5. FIG. 5 illustrates a received power pattern of each receiving antenna with respect to azimuth. Received power of each of the receiving antennas 17(a) and 17(b) becomes highest when θ is in a 0-degree direction. Therefore, for the signals inputted to the receiving antennas 17(a) and 17(b), a pattern of a sum signal (Sum pattern) and a pattern of a difference signal (Diff pattern) are constant as shown in FIG. 5. Accordingly, if a sum signal (Psum) and a difference signal (Pdiff) are calculated from the signals inputted to the receiving antennas 17(a) and 17(b), it is possible to determine azimuth θ from a power ratio of the received signals.

Figure 1A:
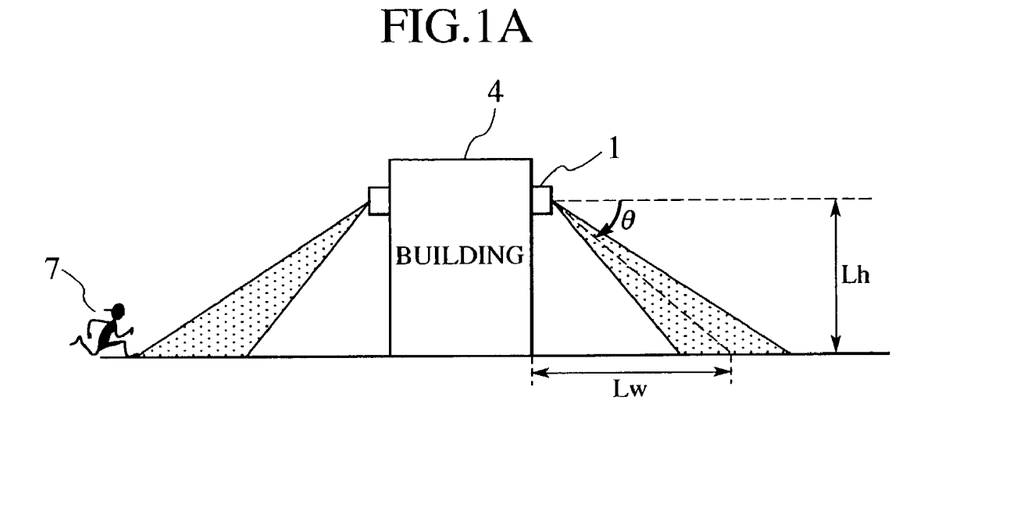
FIGS. 1A to 1C are diagrams illustrating an example of a method in which an object detecting unit is mounted on a building and a radio wave is transmitted to a predetermined area.
Figure 1B:
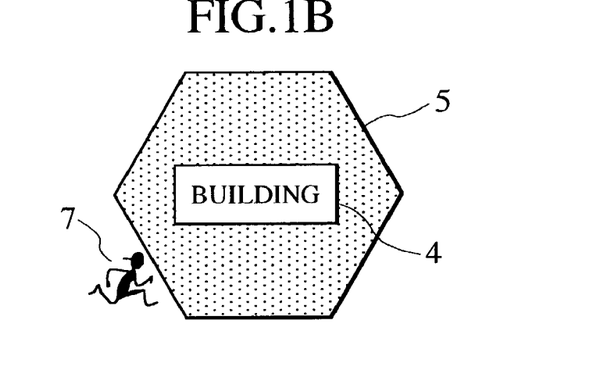
Figure 1C:
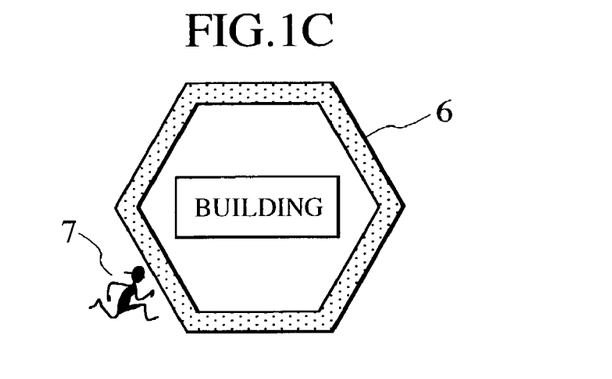

Next, an example of how to determine a position at which a radar device is installed and an emitting angle of the radar device in association with an intrusion prohibited area will be described as below. As shown in FIG. 1A, on the assumption that a radio wave is transmitted from a building to outside, the following are defined: a range from a building to the area where intrusion is to be prohibited is Lw; and a height (from the ground) of the position where the radar device is to be installed is Lh. FIG. 1B is a view which is viewed from the top of the building at this time. An area within the range of a distance Lw from the building is defined as an intrusion prohibited area 5. In this case, the radar device 1 is installed on the building; and as shown in FIG. 1C, a radio wave is transmitted to an area to be emitted 6 at which a range from the building is Lw. FIGS. 1A to 1C are diagrams illustrating an example in which six radar devices, each of which has an antenna with a beam angle of 60°, are installed on the circumference of the building. When an object comes in the emission area 6 shown in FIG. 1C, the radar device 1 calculates the relative velocity, range, and azimuth of the object.

In this case, the relationship between a height Lh at which the radar device is installed and an emitting angle θp is expressed by the following equation:

$$\theta_p = \tan^{-1}\left(\frac{L_h}{L_w}\right) \qquad \text{Equation 3}$$

where θp represents an inclination of a transmitting-receiving antenna of the radar device relative to a horizontal plane. Accordingly, Lw and Lh are determined, and the radar device is obliquely installed so that a radio wave is transmitted in the direction of θp calculated by the equation 1. For example, if a transmitting/receiving unit of the radar is installed at a position having a height of Lh=3 m from the ground and the circumference of the building (Lw=50 m) is to be monitored, the emitting angle of the radio wave is determined as θp≈16°.

Figure 6:
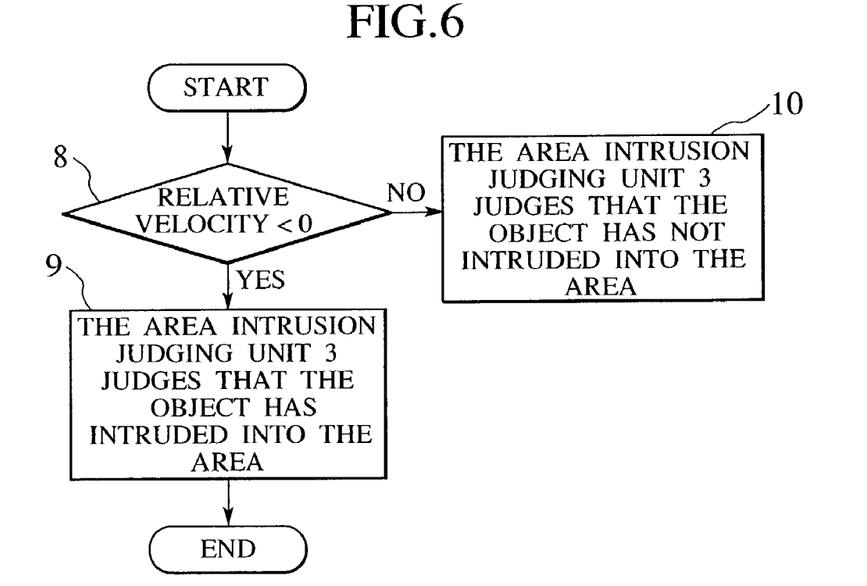
FIG. 6 is a flowchart illustrating an example of processing for judging whether or not an object will intrude into a building.

Next, a process flow of the area intrusion judging unit 3 is illustrated in FIG. 6. In a step 8, if a sign of relative velocity of the object detected by the object detecting unit 2 is negative, it is judged that this object is approaching the building. As a result, in a step 9, the area intrusion judging unit 3 judges that the object has intruded into the area. It should be noted that the sign of the relative velocity of the object detected by the radar device is positive with respect to a direction in which the radar device emits a radio wave. In addition, in the step 8, if the sign of the relative velocity of the object detected by the object detecting unit 2 is not negative, the area intrusion judging unit 3 judges that this object is moving away from the building. As a result, in a step 10, the area intrusion judging unit 3 judges that the object has not intruded into the area.

Second Embodiment

A second embodiment exemplifies a method for placing the object detecting device 1 and the configuration of the object detecting device 1. As is the case with the first embodiment, the second embodiment will be described using a radar device as the object detecting device 1 capable of calculating the relative velocity to the object and its position.

Figure 7A:
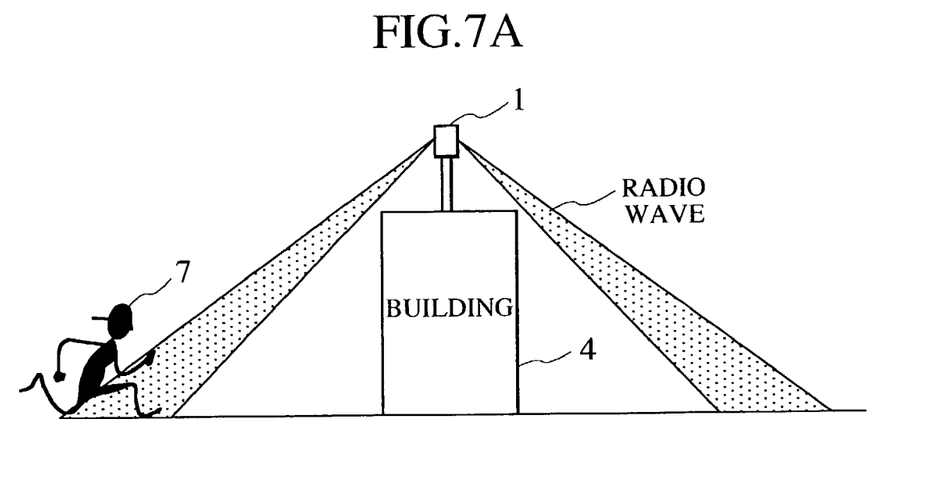
FIGS. 7A to 7C are diagrams illustrating an example of a method in which object detecting devices are installed in a multidirectional manner on the top of a building.
Figure 7B:
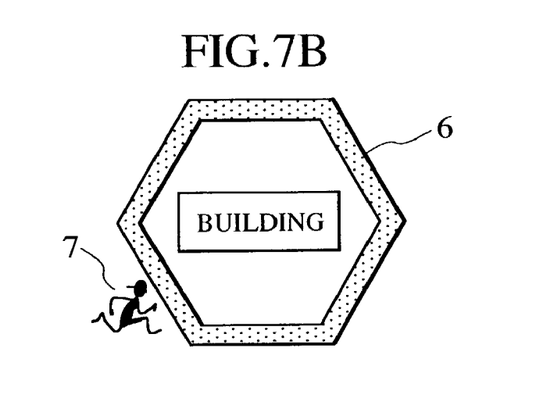
Figure 7C:
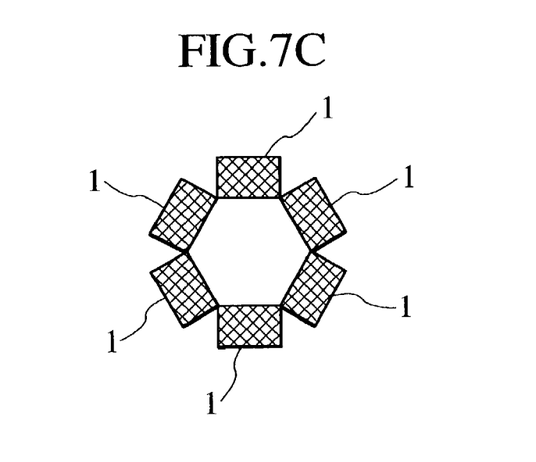

FIG. 7A illustrates a method in which the radar devices are installed in a multidirectional manner so as to cover 360°. According to this method, because the plurality of radar devices are installed in a multidirectional manner, one pole structure can cover 360° around the building as a detection area. A position and an emitting angle θp of each radar device can be calculated using the means similar to that of the first embodiment. FIG. 7B illustrates the emission area 6 of a radio wave, which is viewed from the top of the building; in this figure, six wide-angle antennas, each of which has a beam angle of 60°, are used. When an object intrudes into the emission area 6 shown in FIG. 7B, the radar devices can detect the relative velocity, intrusion position, and velocity of the object relative to the position of the building. FIG. 7C is a diagram illustrating an example of the configuration of the radar devices used at this time.

Third Embodiment

Figure 8:
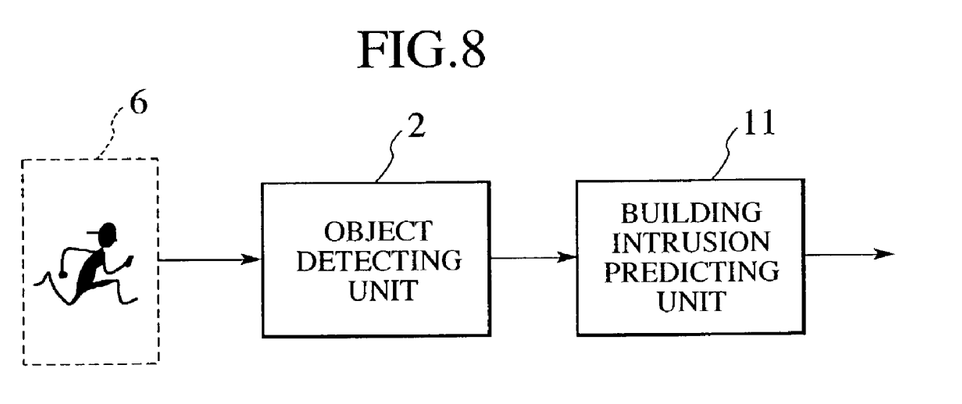
FIG. 8 is a diagram illustrating an example of a configuration in which a judgment is made as to whether or not an intruding object will intrude into a building.

A third embodiment is based on the assumption that a security system capable of the following is used: monitoring a predetermined area from a building to track an object in the area; and thereby predicting whether or not the object will intrude into the building. The third embodiment relates to a method in which the object detecting device 1 is installed on a wall surface of the building, an area around the building is monitored in respective planes thereof to track a detected object, and thereby whether or not the object will intrude into the building is predicted. FIG. 8 illustrates the configuration of this embodiment. The configuration comprises the object detecting unit 2 for detecting an object, and the building intrusion predicting unit 11 for predicting whether or not the detected object will intrude into the building.

Figure 9A:
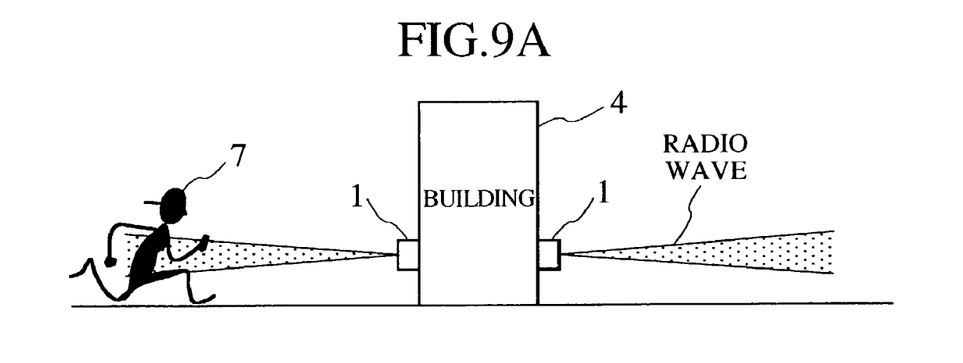
FIGS. 9A to 9C are diagrams illustrating an example of a method in which object detecting devices are installed on a wall surface of a building.
Figure 9B:
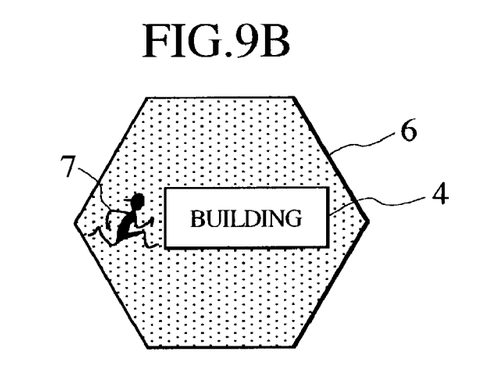
Figure 9C:
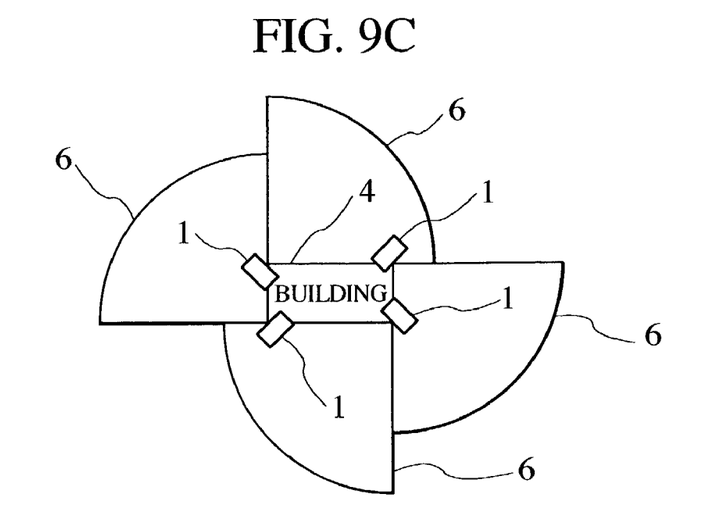

FIG. 9A illustrates an example in which the radar device is installed on the side surface of the building and a radio wave is emitted in parallel with the ground. According to this method, as shown in FIG. 9B, it is possible to cover all of the intrusion prohibited areas around the building as an emission area. For example, an installing method to be applied when using four wide-angle antennas, each of which has a beam angle of 90°, includes a configuration as shown in FIG. 9C.

Figure 10:
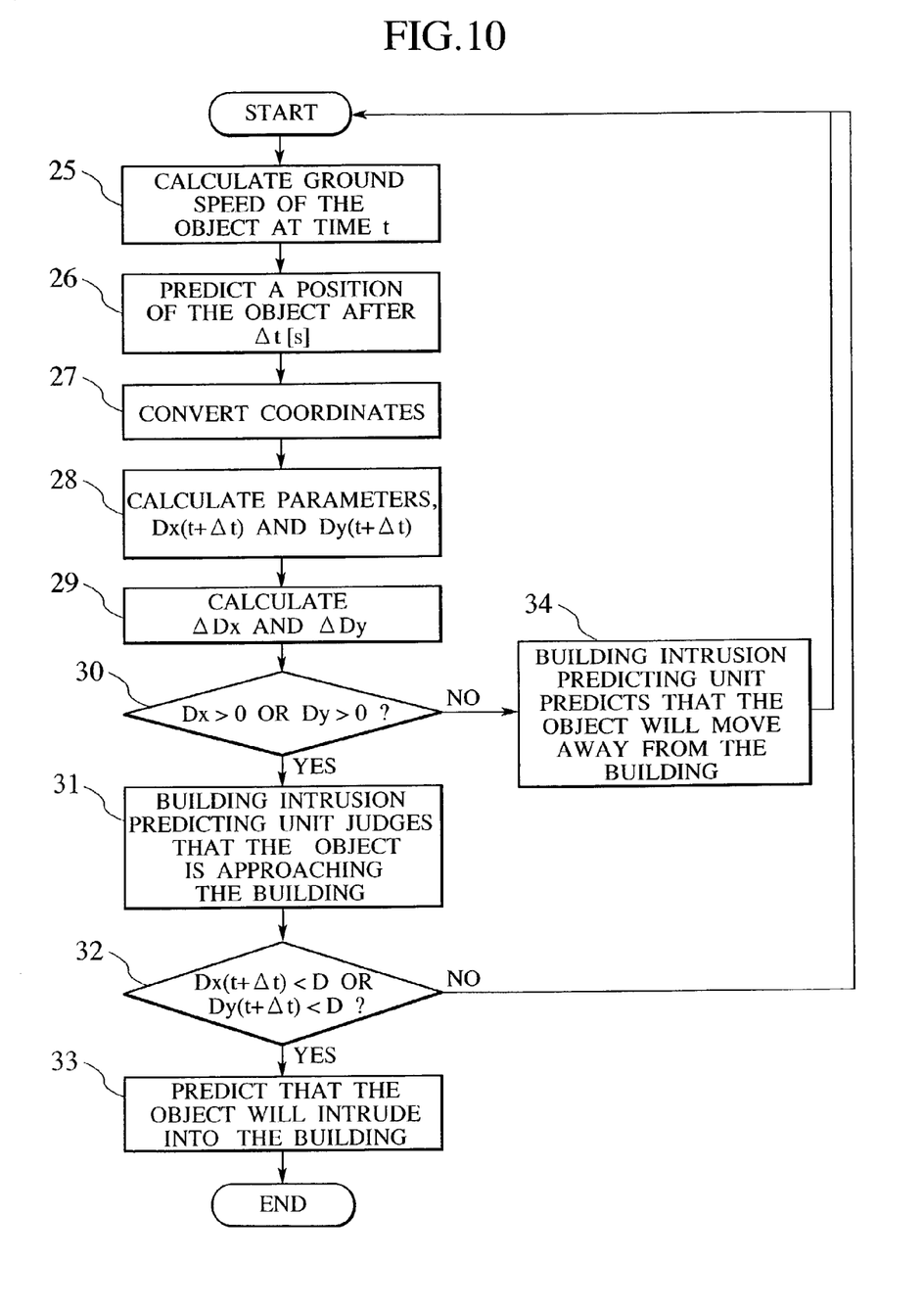
FIG. 10 is a flowchart illustrating an example of processing for judging whether or not an intruding object will intrude into a building.
Figure 11:
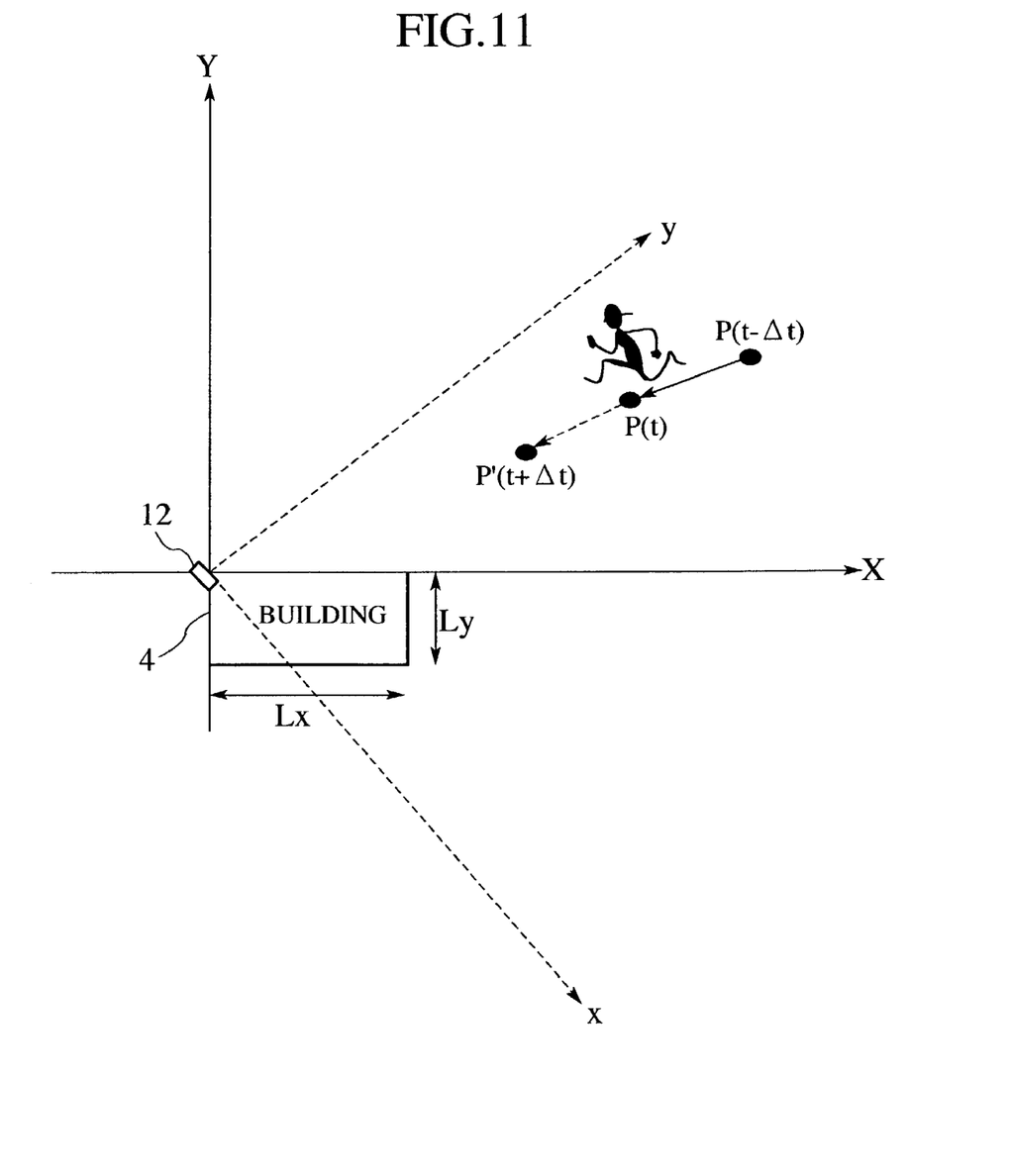
FIG. 11 is a diagram illustrating an example of a calculation method for checking whether or not an intruding object will intrude into a building.

Next, a process flow in the building intrusion predicting unit 11 is shown in FIG. 10, and processing thereof will be described with reference to FIG. 11.

The processing is based on the assumption that an object which has relative velocity v(t), range r(t), azimuth θ(t) has been detected at time t in an emission area of a radar device 12. If a coordinate system x-y relative to the radar device 12 is defined, coordinates (x(t), y(t)) of a position P(t) in the coordinate system x-y, as a position of this object, is expressed by the following equations:

$X(t) = r \sin \theta(t)$ \hfill Equation 4-1

$Y(t) = r \cos \theta(t)$ \hfill Equation 4-2

In a step 25, the velocity V of the detected object is calculated. Using a position of the object (x(t−Δt), y(t−Δt)) calculated at time (t−Δt) and a position of the object (x(t), y(t)) calculated at time (t), the velocity V of the detected object is calculated by the following equation:

$$V = \frac{\sqrt{(X(t) - X(t - \Delta t))^2 + (Y(t) - Y(t - \Delta t))^2}}{t} \qquad \text{Equation 5}$$

Next, the process proceeds to a step 26, a position P(t+Δt) of the detected object after Δt[s] is predicted. Coordinates (x(t+Δt), y(t+Δt)) of the point P(t+Δt) can be expressed by the following equations:

$X(t+\Delta t) = (r(t) - V\Delta t) \sin \theta(t)$ \hfill Equation 6-1

$Y(t+\Delta t) = (r(t) - V\Delta t) \cos \theta(t)$ \hfill Equation 6-2

The point P(t+Δt) calculated by the above-mentioned step is represented by coordinates in the coordinate system x-y relative to the radar device 12. In FIG. 11, a coordinate system X-Y is defined. In the coordinate system X-Y, the radar device 12 is installed at its center, a horizontal direction of the building is X, and a vertical direction of the building is Y.

In a step 27, the position P(t+Δt) is converted into a point P'(t+Δt) in the coordinate system X-Y. If a length of an X direction of the building is Lx and a length of a Y direction is Ly, coordinates (X(t+Δt), Y(t+Δt)) of the point P'(t+Δt) can be expressed by the following equations:

$$X(t+\Delta t) = \frac{1}{\sqrt{2}} x(t+\Delta t) + \frac{1}{\sqrt{2}} y(t+\Delta t) \qquad \text{Equation 7-1}$$

$$Y(t+\Delta t) = -\frac{1}{\sqrt{2}} x(t+\Delta t) + \frac{1}{\sqrt{2}} y(t+\Delta t) \qquad \text{Equation 7-2}$$

Next, the process proceeds to a step 28, a position of the object after Δt[s] calculated in the step 15, and parameters Dx(t+Δt) and Dy(t+Δt) which represent the relation with a position of the building, are calculated by the following equations:

$$Dx(t+\Delta t)=X(t+\Delta t)-Lx \quad \text{Equation 8-1}$$

$$Dy(t+\Delta t)=Y(t+\Delta t)-Ly \quad \text{Equation 8-2}$$

In a step 29, a difference between the Dx(t+Δt) calculated in the step 28 and the Dx(t) calculated at time t, and a difference between the Dy(t+Δt) calculated in the step 28 and the Dy(t) calculated at time t, are calculated by the following equations:

$$\Delta Dx=Dx(t)-Dx(t+\Delta t) \quad \text{Equation 9-1}$$

$$\Delta Dy=Dy(t)-Dy(t+\Delta t) \quad \text{Equation 9-2}$$

In a step 30, if ΔDx or ΔDy, which has been calculated in the step 29, is positive, the process proceeds to a step 31, and the building intrusion predicting unit 11 judges that this object is approaching the building. In a step 32, if Dx(t+Δt) or Dy(t+Δt), which has been calculated in the step 28, is smaller than a predetermined value D, then the process proceeds to a step 33 where the building intrusion predicting unit 11 predicts that the object will intrude into the building.

On the other hand, in the step 30, if Dx or Dy, which has been calculated in the step 29, is negative, the process proceeds to a step 34 where the building intrusion predicting unit 11 judges that this object is moving away from the building, resulting in prediction that the object will not intrude into the building.

According to the present invention, it is possible to detect an object before the object intrudes into a building. In addition, the object can be detected even in bad weather such as rain, fog, and snow. Accordingly, security is improved. Moreover, because a wide-angle antenna having a large emitting angle is used, the number of sensors can be reduced. Further, the antennas are installed on the building, which results in decrease in wiring and costs (easy installation is available). In addition, because a radio wave is utilized, it is not necessary to adjust an optical axis, which improves efficiency in installation (easy installation is available).

Additionally, in the present invention, because a plurality of object detecting devices are installed in a multidirectional manner so as to cover a predetermined area which is within a range of 360°, it is possible to reduce the number of locations where the object detecting devices are installed (easy installation is available).

Moreover, in the present invention, after an object in a predetermined area is detected, the detected object is tracked. Accordingly, it is possible to determine a path of the object before the object intrudes into a building, which improves security.

Furthermore, in the present invention, because the object detecting units are installed on a wall surface of the building, it is possible to detect intrusion of the object without marring outward appearance.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A security system comprising:
   an object detecting unit which emits a radio wave from a building to a predetermined area outside the building, receives a wave reflected from an object, and detects the object on the basis of the reflected wave; and
   an area intrusion judging unit for judging whether or not the object will intrude into the predetermined area on the basis of output of the detecting unit, wherein:
   the object detecting unit comprises one transmitting antenna and two receiving antennas which receive the reflected wave corresponding to a wave transmitted by said transmitting antenna; and
   the object detecting unit detects a distance to the object, a relative velocity of the object and an azimuth of the object, on the basis of the difference between signals each received by the receiving antennas.

2. A security system according to claim 1, wherein said object detecting unit calculates a position of the object.

3. A security system according to claim 1, wherein said object detecting unit comprises:
   a transmitting unit for transmitting a radar wave;
   a receiving unit for receiving the reflected radar wave; and
   a signal processing unit for processing data of the received radar wave.

4. A security system according to claim 3, wherein said signal processing unit calculates relative velocity to the object and a position of the object on the basis of the radar wave received by the receiving unit, and the reflected radar wave.

5. A security system according to claim 1, wherein said transmitting unit transmits at least two radar waves, each of which has a frequency different from each other, while switching said radar waves at intervals of a predetermined period of time.

6. A security system according to claim 1, wherein a traveling direction of the object relative to the building is detected by checking a sign of the relative velocity calculated by the signal processing unit to see whether the sign is positive or negative.

7. A security system according to claim 1, wherein said object detecting unit includes a plurality of object detecting devices installed in a multidirectional manner so as to cover the predetermined area through a range of 360°.

8. A security system comprising:
   an object detecting unit which emits a radio wave from a building to a predetermined area outside the building, receives a wave reflected from an object, and detects the object on the basis of the reflected wave; and
   a building intrusion predicting unit for tracking the object in the predetermined area on the basis of output of the detecting unit, wherein:
   the object detecting unit comprises one transmitting antenna, and two receiving antennas which receive the reflected wave corresponding to a wave transmitted by said transmitting antenna; and
   the object detecting unit detects a distance to the object, a relative velocity of the object and an azimuth of the object, on the basis of the difference between signals each received by the receiving antennas.

9. A security system according to claim 8, wherein,
   the building intrusion predicting unit predicts whether or not the object will intrude into the building; and
   the object detecting unit has object detecting devices installed on a wall surface of the building so as to cover the predetermined area through a range of 360°.

* * * * *